United States Patent [19]

MacDiarmid et al.

[11] Patent Number: 5,147,913

[45] Date of Patent: Sep. 15, 1992

[54] CROSS-LINKED POLYMERS DERIVED FROM POLYANILINE AND GELS COMPRISING THE SAME

[75] Inventors: Alan G. MacDiarmid, Drexel Hill; Xun Tang, Glenolden, both of Pa.

[73] Assignee: Trustees of the University of Penna., Philadelphia, Pa.

[21] Appl. No.: 652,922

[22] Filed: Feb. 8, 1991

[51] Int. Cl.$^5$ .......................................... C08K 5/3415
[52] U.S. Cl. .................... 524/104; 528/422; 528/480; 525/540
[58] Field of Search ............... 524/104; 528/422, 480; 525/540

[56] References Cited

PUBLICATIONS

Yoshino, et al., J. Phys.: Condens. Matter, 1990 2, 2857.
Yoshino, et al., Solid State Communications, 1989, 70, 609.
Yoshino, et al., Japanese Journal of Applied Physics, 1989, 28, 682.
Chiang, et al., Synth. Met., 1986, 13, 195.
MacDiarmid, et al., Conducting Polymers, L. Alcacer, ed., Reidel Publ., Dordrecht, Holland, p. 105 (1987).
McManus, et al., J. Chem. Soc., Chem. Comm., 1985, 1556.
Wrek, Synth. Met., 1986, 15, 213.
MacDiarmid, et al., Synth. Met., 1987, 18, 285.
MacDiarmid, et al., Faraday Discuss. Chem. Soc., 1988, 88, 317.
Angelopoulos, et al., Mol. Cryst. Liq. Cryst., 1989. 88, 317.
MacDiarmid et al; Faraday Discuss. Chem. Soc., 1989, 88; pp. 317–332.

*Primary Examiner*—Paul R. Michl
*Assistant Examiner*—Edward Cain
*Attorney, Agent, or Firm*—Woodcock Washburn Kurtz Mackiewicz & Norris

[57] ABSTRACT

Cross-linked polymer networks derived from polyaniline and polyaniline derivatives are provided, as well as preparative methods therefor. Also provided are gels comprising cross-linked polymer and a liquid.

The cross-linked polymers preferably are prepared by providing a substantially linear polymer which comprises polyaniline and/or a polyaniline derivative, admixing the linear polymer with a liquid in which the cross-linked polymer is substantially insoluble, and cross-linking the polymer through agitation.

The cross-linked polymers of the invention can be employed to fabricate shaped articles which reversibly expand and contract in either an isotropic or anisotropic fashion and may find use in gas and/or liquid separations.

37 Claims, 5 Drawing Sheets

CROSS-LINKED POLYMERS DERIVED FROM POLYANILINE AND GELS COMPRISING THE SAME

GOVERNMENT SUPPORT

Portions of this invention were supported by Department of Defense grant N00014-86-K-0766.

BACKGROUND OF THE INVENTION

This invention relates to cross-linked polymers derived from polyaniline, to gels comprising the cross-linked polymers, and to articles fabricated therefrom.

A great deal of research effort has been directed to polyaniline, due in large part to its excellent stability and the relatively high levels of electrical conductivity of certain of its chemical and structural forms. For example, one form of polyaniline known as "emeraldine base" or "polyaniline base"—depicted in structure (1), wherein Y=0.5—can be protonated by dilute aqueous protonic acid such as hydrochloric acid to produce the corresponding salt—depicted in its bipolaronic form in structure (2), wherein Y=0.5 and A=Cl—which exhibits conductivities of about 1-5 Siemans per centimeter (S/cm) when in the form of a compressed powder pellet.

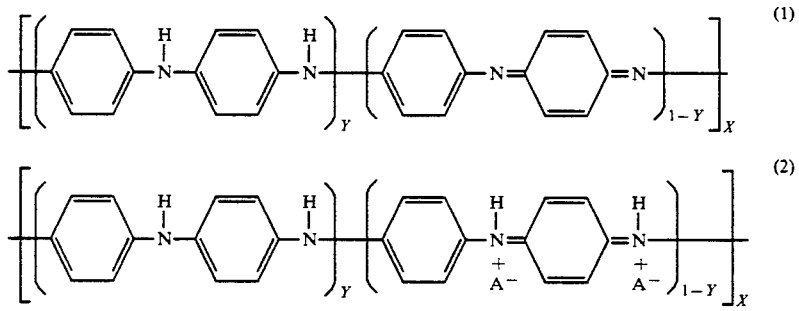

The protonated or doped form of emeraldine base exhibits the highest conductivity of any unsubstituted polyaniline. It will be understood that the term "unsubstituted polyaniline" refers to compounds having structures such as (1) and (2), wherein hydrogen atoms are attached to the carbon/nitrogen backbone. Unsubstituted polyanilines are to be contrasted with substituted polyanilines—also known as polyaniline derivatives—wherein one or more of the hydrogen atoms are replaced by alkyl, alkoxyl, or other types of chemical functional groups It will understood that the term "polyaniline" as used hereinafter refers to unsubstituted compounds and, unless otherwise noted, to oxidation states wherein Y is approximately 0.5.

For many applications, it is necessary that conducting polyaniline polymers be processed into shaped articles such as fibers, films, and composites thereof. Unfortunately, however, it is typically quite difficult to fabricate shaped articles from conductive polyaniline, even though these polymers can be synthesized with relative ease. The difficulties which attend the processing of conductive polyanilines are largely attributable to the infusibility of the polymers in both doped and undoped forms. Also, there appear to be few solvents which will form polymer solutions from which the polymers can be recovered substantially unchanged. For example, the only such solvent showing useful solubility for emeraldine base is 1-methyl-2-pyrrolidinone (NMP). Emeraldine base can also be dissolved in an 80 weight percent solution of acetic acid, from which films of doped emeraldine acetate can be recovered upon solvent evaporation. Emeraldine base can also be dissolved in concentrated sulfuric acid, from which emeraldine sulfate can be recovered by diluting the solution with water.

Films and fibers of doped and undoped polyaniline can be obtained from the solvents noted above, but there presently is no convenient way to obtain shaped articles of either the pure doped or undoped polymer. Even if objects could be obtained from the base forms of the polyanilines, dopant likely would diffuse into such objects very slowly. As a result, costly and time-consuming processing steps would be necessary to produce articles comprising conductive polyaniline. Considerable attention has therefore been devoted to the development of polyaniline derivatives having improved processing properties, particularly solubility.

A gel, as will be appreciated by those skilled in the art, is a form of matter which is intermediate between a solid and a liquid. Gels typically comprise a cross-linked polymer network which is swellable in a selected liquid medium. Given the wide variety of polymers and liquids known in the art, an exceedingly wide variety of gels may theoretically be prepared.

The properties of a gel depend strongly on the chemical composition and interaction of its constituent polymer and liquid. For example, it has been found that drastic volume changes for many gels can be effected by changing the composition of the liquid and also through temperature variation, irradiation, and the application of electric fields. Those skilled in the art will recognize that the expansion of a gel in response to a liquid is more commonly known as swelling.

While the behavior of gels has generated considerable research interest, few of the gels studied to date have been prepared from electrically conductive polymers. Yoshino, et al. (J. Phys. : Condens. matter, 1990, 2, 2857, Solid State Communications, 1989, 70, 609, and Japanese Journal of Applied Physics, 1989, 28, 682) have disclosed gels which contain conductive poly(3-alkylthiophene) having structure (3).

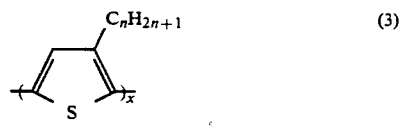

Yoshino, et al. indicate that the volume, shape, and color of poly(3-alkylthiophene) gels changes drastically with solvent composition and temperature, and that drastic shrinkage is observed upon doping the polymer with iodine. This shrinkage was attributed to cross-linking between polymer chains. Yoshino, et al., hypothesized that conductive polymer gels may be useful as molecular actuators and other applications where shape memory is desired.

OBJECTS OF THE INVENTION

It is one object of the present invention to provide cross-linked polymers.

It is another object to provide gels comprising cross-linked polymers.

It is a further object to provide polymer gels which conduct electric current.

It is still another object to provide polymer gels which comprise polyaniline and polyaniline derivatives.

It is a yet another object to provide polymer gels wherein polymer cross-linking is effected principally by crystallization rather than by covalent bonding and other chemical interactions.

It is another object to provide shaped articles fabricated from cross-linked polymer.

It is yet another object of this invention to provide shaped articles which exhibit shape memory.

SUMMARY OF THE INVENTION

These and other objects are accomplished by the present invention, which provides cross-linked polymers derived from polyaniline, gels comprising the cross-linked polymers, and preparative methods therefor. In general, the gels comprise a network of cross-linked polyaniline and/or polyaniline derivative which is swellable in a selected liquid. In certain preferred embodiments, the gels have the capacity to conduct electric current and comprise cross-linked polyanilene and 1-methyl-2-pyrrolidinone. In other preferred embodiments, conductive gels comprise poly(2-alkoxyaniline) salt and an organic or aqueous liquid.

The cross-linked polymers and gels of the present invention are preferably prepared by providing a substantially linear polymer which comprises at least one polyaniline derivative, admixing the polymer with a liquid in which the cross-linked polymer is substantially insoluble, and cross-linking the polymer through agitation. Where the base form of the polyaniline polymer is employed, the resultant cross-linked network can be rendered conductive through treatment with aqueous protonic acid. The cross-linked polymer networks may be isolated from the gels of the invention by removal of the liquid by evaporation or other suitable means.

Shaped articles comprising the cross-linked polymer can be fabricated by placing the admixture in contact with a mold or some other substrate before full cross-linking has occurred. Gels and shaped articles reversibly expand and contract in response to their liquid component and, thus, exhibit shape memory.

BRIEF DESCRIPTION OF THE DRAWINGS

The numerous objects and advantages of the present invention may be better understood by those skilled in the art by reference to the accompanying figures, in which.

DESCRIPTION OF PREFERRED EMBODIMENTS

Figure 1:
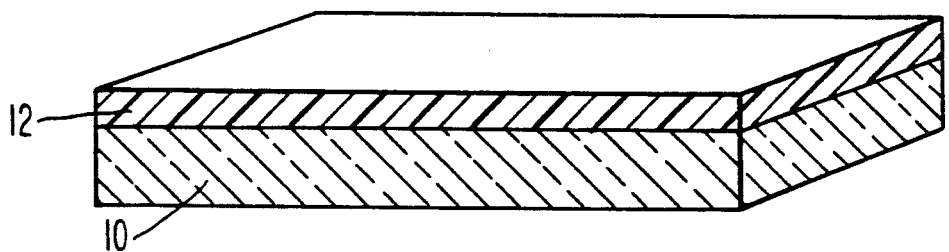
FIG. 1 is a cross-sectional view showing a polyaniline gel film which has been formed on a substrate.

The cross-linked polymers and gels of the present invention are prepared from polymers which comprise at least one polyaniline derivative. As employed herein, the term "polyaniline derivative" includes polyaniline, polyaniline salts, and all polymers derived by replacing one or more hydrogen atoms on the carbon/nitrogen backbones of such moieties with a chemical functional group. Exemplary polyaniline derivatives have structures (4) and (5):

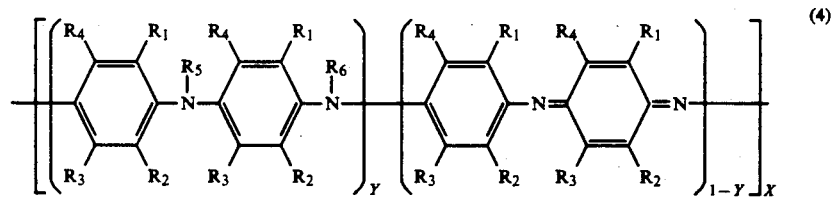

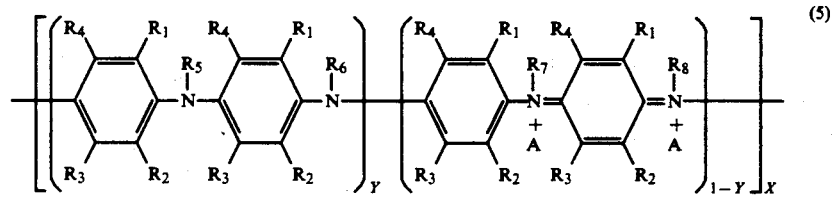

wherein A is an anionic species, $Y=0-1$, and $R_1$, $R_2$, $R_3$, and $R_4$ are independently hydrogen, alkyl having from about 1 to about 6 carbon atoms, alkoxyl having from about 1 to about 6 carbon atoms, $SO_3H$, or $R_r$—$SO_2$ or $R_r$—$CO_2$, wherein $R_r$ is aryl or alkyl having from about 1 to about 6 carbon atoms, and $R_5$, $R_6$, $R_7$, and $R_8$ are independently hydrogen, alkyl having from about 1 to about 6 carbon atoms, alkoxyl having from about 1 to about 6 carbon atoms, or $R_r$—$SO_2$ or $R_r$—$CO_2$, wherein $R_r$ is aryl or alkyl having from about 1 to about 6 carbon atoms. Preferably, Y is about 0.5. Preferred polyaniline derivatives include emeraldine base and emeraldine salt—depicted in structures (4) and (5), respectively, wherein $Y=0.5$ and $R_1$, $R_2$, $R_3$, $R_4$, $R_5$, $R_6$, $R_7$, and $R_8=H$—as well as poly(2-alkoxyaniline) and poly(2-alkoxyaniline) salts—depicted in structures (4) and (5), respectively, wherein $R_1$=alkoxyl and $R_2$, $R_3$, $R_4$, $R_5$, $R_6$, $R_7$, and $R_8=H$. Alkoxyl groups having 1 and 2 carbon atoms—more commonly known as methoxy and ethoxy groups, respectively—are preferred; ethoxy groups are particularly preferred. The polyaniline derivatives may be prepared by any of the techniques known in the art. Exemplary preparative techniques are disclosed by U.S. Pat. Nos. 4,820,595 and 4,940,640, which are incorporated herein by reference, and also by Chiang, et al., Synth. Met., 1986, 13, 195; MacDiarmid, et al., Conducting Polymers, L. Alcacer, ed., Reidel Publ., Dordrecht, Holland, p. 105 (1987); McManus, et al., J. Chem. Soc., Chem. Comm., 1985, 1556; Wrek, Synth. Met., 1986, 5, 213; MacDiarmid, et al., Synth. Met., 1987, 18, 285; and MacDiarmid, et al., Faraday Discuss. Chem. Soc., 1989, 88, 317.

The polyaniline gels of this invention comprise from about 5 to about 90 weight percent polyaniline derivative, preferably from about 25 to about 75 weight percent, more preferably from about 25 to about 50 weight percent. For certain applications, it may prove useful to prepare solid blends from polyaniline gel by swelling a gel with a liquid which contains one or more conventional polymers and then removing the liquid by, for example, evaporation. Non-limiting examples of potentially useful conventional polymers include polyacrylates, polyacrylamides, polyvinyls, polyurethanes, and epoxies.

The polymer used to prepare the gel should have a substantially linear—as opposed to cross-linked—polymer structure. While polymers having a minor amount of cross-linking may be desired for certain applications, the polymers employed in the present invention preferably have at least some remaining capacity to cross-link, since it is the cross-linking of linear polymer chains which is believed to characterize the formation of a gel. The degree of linearity required for a gel-forming polymer will depend upon such factors as its chemical composition and structure, its solubility and that of its cross-linked form in a liquid of interest, and the application anticipated for the resultant gel.

It is preferred that the cross-linked polymers and gels of the present invention be prepared by admixing a substantially linear polymer with a liquid to produce a mixture comprising from about 0 to about 50 weight percent polyaniline derivative, preferably from about 5 to about 30 weight percent, more preferably about 20 weight percent. Both the chemical composition and amount of the liquid should be selected such that the linear polymer is at least slightly soluble and the cross-linked polymer substantially insoluble therein. Preferred liquids are those which have the capacity to swell the cross-linked polymer network. It has been found, for example, that preferred liquids for preparing gels from emeraldine base comprise 1-methyl-2-pyrrolidinone (NMP), which is believed to swell the cross-linked polymer through hydrogen-bonding.

It is preferred that the linear polymer and the liquid be mixed with stirring or some other suitable form of agitation. Stirring generally results in a noticeable increase in the viscosity of the mixture. This viscosity increase, which is generally followed by gradual solidification of the mixture, is believed to be attributable to the onset of cross-linking. The present invention, however, is not limited to processes wherein the mixture of polymer and liquid solidifies through cross-linking. Thus, the term "cross-linking" as employed herein is intended to denote solidification of the polymer/liquid mixture, whether by interconnection of polymer chains or by some other means. In addition, the invention is not limited to methods wherein cross-linking is initiated by stirring or agitation. Any of the wide variety of methods known in the art to solidify the mixture may be used. For example, cross-linking may be initiated by irradiation, chemical treatment, or other means known in the art.

Once cross-linking has begun, shaped articles can be fabricated by transferring the admixture to a mold or some other suitably shaped container or substrate. Once transferred, cross-linking is allowed to continue. As recognized by those skilled in the art, an exceedingly wide variety of shaped articles may be fabricated from the cross-linked polymers and gels of the present invention by an equally wide variety of well-known techniques. Examples of such articles include fibers, films, coatings, batteries, fuel cells, electrodes, and other electrochemical devices. FIG. 1 shows polyaniline gel film 12 which has been prepared by allowing a mixture of polymer and liquid to cross-link on substrate 10.

It is believed that cross-linking is effected in the present invention substantially through a physical mechanism rather than through covalent bonding or a somewhat weaker chemical interaction. More specifically, the cross-linked polymers and gels are believed to form substantially by localized crystallization or microcrystallization of the polymer chains. It is possible, however, that the polymers form covalent cross-linkages as well. Evidence for the formation of a cross-linked polymer network through microcrystallization is provided by the fact that repeated doping and undoping of the polyaniline gel converts it from a material which is insoluble in NMP to one which is soluble in NMP. Also, cyclic voltametry of these moieties does not show a change in the polymer backbone such as one would expect were cross-linking effected by covalent bonding or other chemical means.

As will be appreciated by those skilled in the art, the rate and degree of cross-linking in polymer can be controlled by a wide variety of methods involving, for example, temperature variation, irradiation, and/or chemical treatment. It will also be appreciated that the properties and structure of such a polymer and gels derived therefrom are highly dependent upon the rate and degree of cross-linking. Thus, by careful process control one can produce polymers and gels which are suitable for a wide variety of applications. For example, by controlling the extent of cross-linking and, hence, the size of holes or pores in the polymer network, it may be possible to produce porous films which are useful for gas and/or liquid separations. It appears that such control can be effected through, for example, stretching and/or doping. Thus, as discussed in Example 6 below, where one desires a polymer possessing increased cross-linking, the polymer gel film can be stretched to increase the extent of microcrystallization.

The properties and structure of cross-linked polymers and gels are also highly dependent upon any after-formation processing steps performed. For example, it is preferred that any low molecular polymer which has not cross-linked be removed from the polymer matrix by washing with a solvent in which the low molecular weight polymer is soluble. Extraction in this manner generally makes the cross-linked polymer network stronger.

It will be understood that the present invention is not limited to the methods set forth herein. Doubtless other preparative techniques will become known through the further work of those in the art. Moreover, additional objects, advantages, and novel features of the invention will become apparent to those skilled in the art upon examination of the following examples thereof, wherein parts and percents are by weight unless otherwise indicated.

EXAMPLE 1

Preparation of Emeraldine Base Film

Emeraldine base films were prepared according to the method set forth by Angelopoulos, et al., Mol. Cryst. Liq. Cryst., 1988, 160, 151 from emeraldine base powder prepared according to the method set forth by MacDiarmid, et al., Conducting Polymers, L. Alcacer, ed., Reidel Publ., Dordrecht, Holland, p. 105 (1987).

The properties of these films when place in NMP varied significantly from one preparation to another. The amount of the soluble polyaniline species extractable by NMP varied from about 93% to about 50% of the original film weight. The extent to which the dry film from which all solid material had been extracted by NMP swelled when placed in NMP also varied considerably according to minor variations in experimental procedure which were difficult to reproduce.

One sample of emeraldine base film contained about 15% NMP by thermal gravimetric analysis (TGA). The shear modulus of the film (G') as measured by dynamic mechanical analysis (DMA) indicated that the film started to soften at about 60° C., became very soft at about 130° C., and became stiff as the NMP evaporated.

EXAMPLE 2

Preparation of Emeraldine Base Gel

Approximately 2 g. of the polymer powder prepared in Example 1 was added to a beaker containing about 10 ml. NMP. The intense blue mixture was then stirred at room temperature. After about 15 minutes, the mixture had become very viscous and was poured onto a glass plate. After about 5 to 10 minutes, the mixture congealed into a jelly-like material and was held at about 60° C. for about 1.5 hours under a nitrogen atmosphere to promote further gelation. The film did not dry uniformly; the portions which were not completely dry were highly elastomeric. After the gel was left at room temperature for about 16 hours a flexible, bronze film was peeled from the glass plate.

Alternatively, if the viscous solution was poured before gelation into a container such as a test tube, a cohesive, flexible, elastomeric, gel rod was obtained by breaking the test tube.

EXAMPLE 3

Treatment of Gel Film

Linear polymer and low molecular weight moieties were removed from a sample of gel film prepared according to Example 2 by repeatedly washing the dry, bronze film with aliquots of NMP until the solvent extract became colorless. About 20% of the polymer was removed by washing. The film swelled during the washing process.

Figure 2:
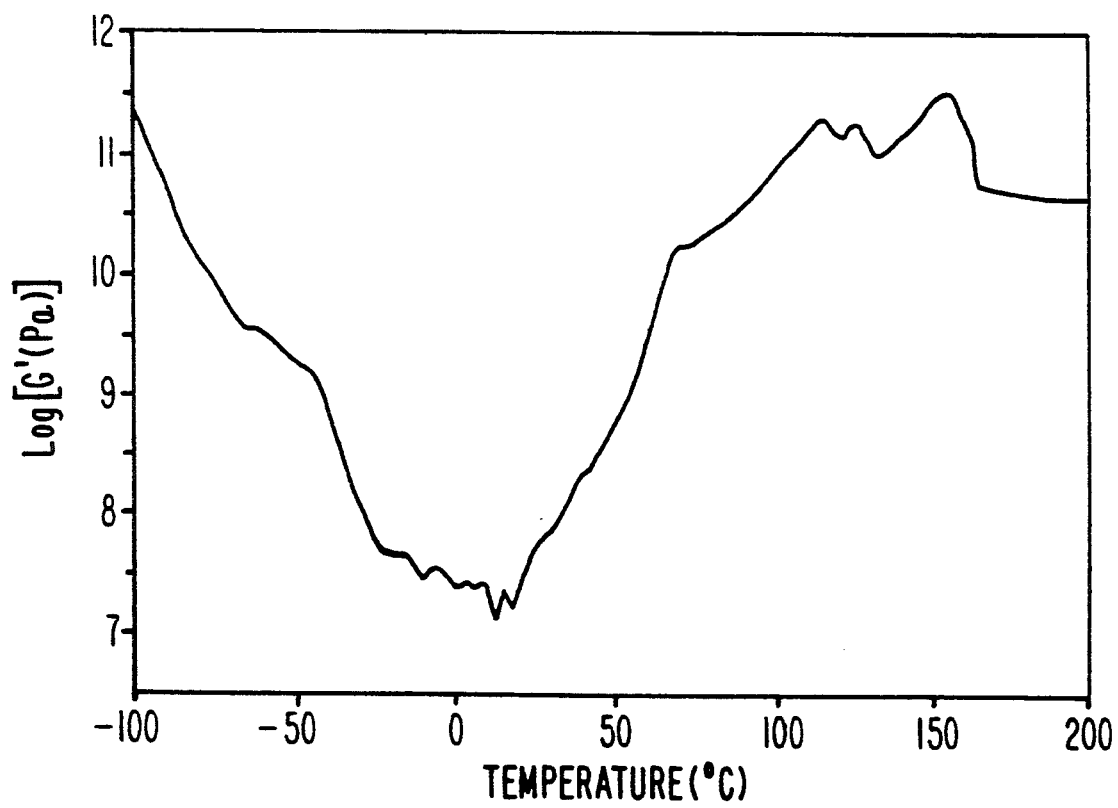
FIG. 2 is a graph showing the behavior of a sample of polyaniline gel film under dynamic mechanical analysis.

The gel film so obtained contained more than about 50% NMP as measured by TGA. As shown in FIG. 2, the shear modulus (G') as measured by DMA indicated that the film started to soften at about −40° C., became very soft after passing about −22° C., the melting point of NMP, and kept softening up to about 50° C. At higher temperatures, the film became stiff as the NMP evaporated.

EXAMPLE 4

Dependency of Volume Shrinkage on Liquid Component

Figure 3:
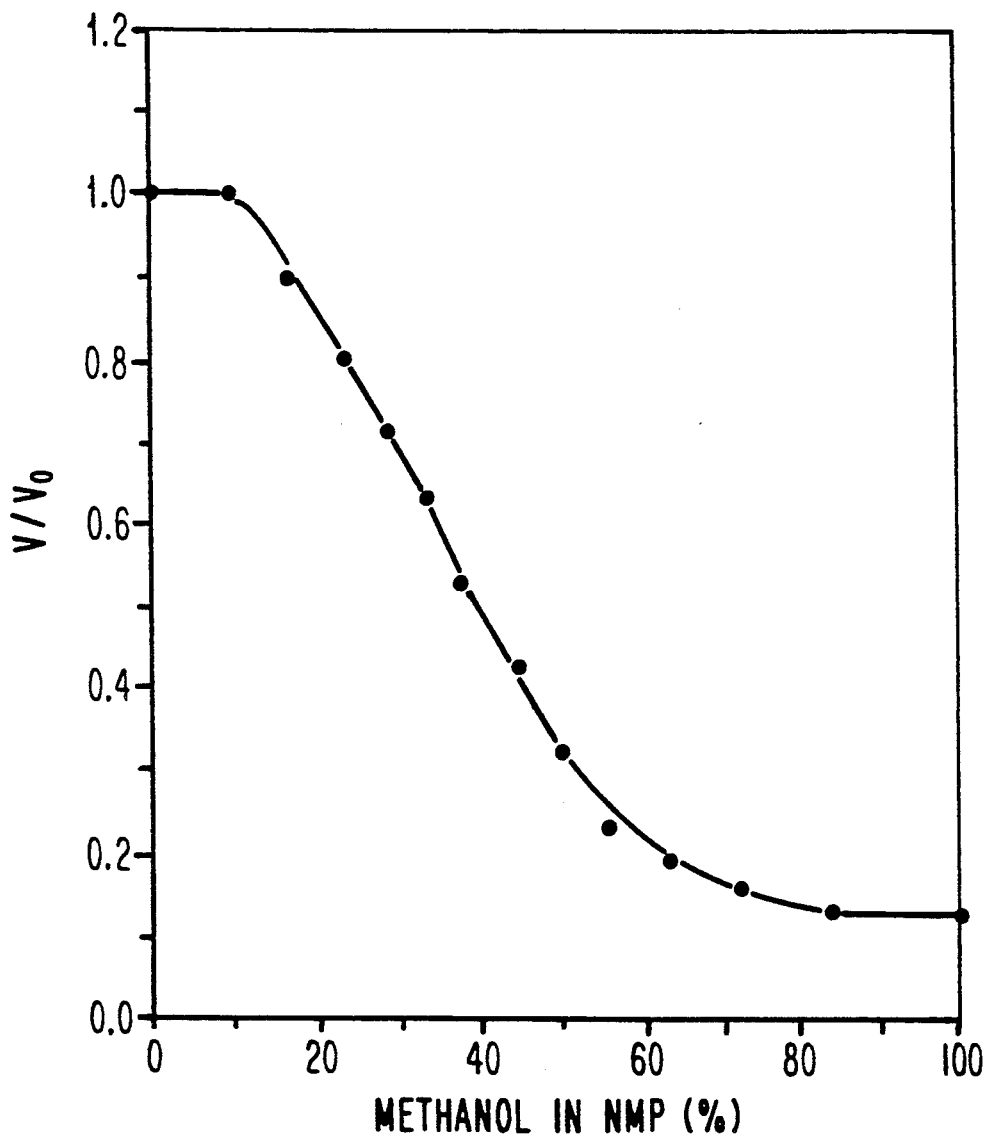
FIG. 3 is a graph showing the manner in which the volume of a sample of polyaniline gel film depends upon the composition of the liquid in which it is immersed.

A sample of gel film measuring 20.0 mm.×20.0 mm.×0.125 mm. and prepared according to Example 2 was placed in a beaker containing NMP. After repeated washing with NMP until the NMP extract was colorless, the film was again measured (29.0 mm.×29.0 mm.×0.181 mm.) and its volume ($V_0$) calculated. The film was then sequentially placed in beakers containing varying proportions of NMP and methanol. After about 10 minutes in a beaker, the film was removed, measured while still wet, and its volume (V) determined. FIG. 3 shows the data obtained.

As can be seen, NMP tends to swell the gel, while methanol tends to shrink the gel. Moreover, the expansion and contraction appear to be isotropic as well as reversible; that is, the film appears to expand and contract equally in each dimension, and shrunken film can be swollen by immersion in NMP. It will be recognized that since the gel film can be shrunken or swollen to its original dimensions, it can be said to possess shape memory.

The observed affinity of the gel for a nitrogen-containing solvent such as NMP is believed to be attributable to nitrogen/nitrogen hydrogen-bonding interactions between the solvent and the cross-linked polymer. Thus, oxygen-containing polyaniline derivatives such as poly(2-alkoxyanilines) may swell through hydrogen-bonding with oxygen-containing solvents such as methanol and water. Such polymers may also shrink in the presence of nitrogen-containing solvents such as NMP.

EXAMPLE 5

Anisotropic Expansion of Stretch-Aligned Gel Film

A sample of dry gel film prepared according to Example 2 containing about 19% NMP by TGA measurement and having a length of 9.5 mm. was mechanically stretched at about 100° C. under nitrogen atmosphere to about 1.5 times its original length. The sample was cut into a 12 mm.×12 mm. ($L_0=W_0$) square and immediately immersed in NMP. Soluble portions were extracted by washing with NMP until the extract was colorless. After immersion in NMP for about 16 hours, the film had expanded to about 23 mm. in the direction (L) perpendicular to the stretching direction but had contracted to 11.9 mm. in the direction (W) parallel to the stretching direction. Removing the film from the NMP and immersing it in methanol caused the film to shrink only in the direction (L) perpendicular to the stretching direction and to expand very slightly in the direction (W) parallel to the stretching direction. The film returned to dimensions (L=9.9 mm., W=10.1 mm.) slightly smaller than the original dimensions, presumably since it contained no NMP. Thus, the stretched film expanded and contracted in an anisotropic, yet reversible, fashion, exhibiting a shape memory effect.

Figure 4:
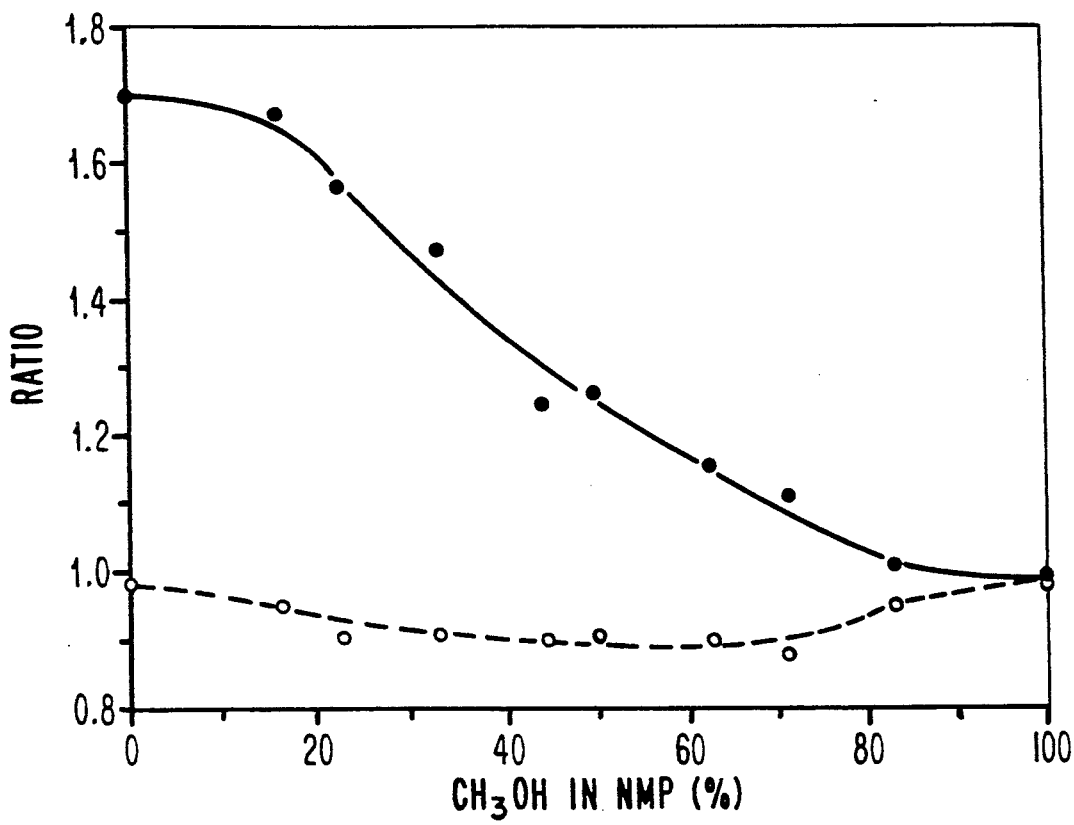
FIG. 4 is a graph showing the anisotropic manner in which a stretched sample of polyaniline gel film expands and contracts upon variation of the liquid in which it is immersed.

The film was then sequentially placed in beakers containing varying proportions of NMP and methanol. After about 10 minutes in a beaker, the film was removed and measured while still wet. The data obtained are set forth in FIG. 4, wherein the symbol "." denotes $L/L_0$ and the symbol "°" denotes $W/W_0$.

EXAMPLE 6

Increased Crystallinity Through Stretching

Figure 5:
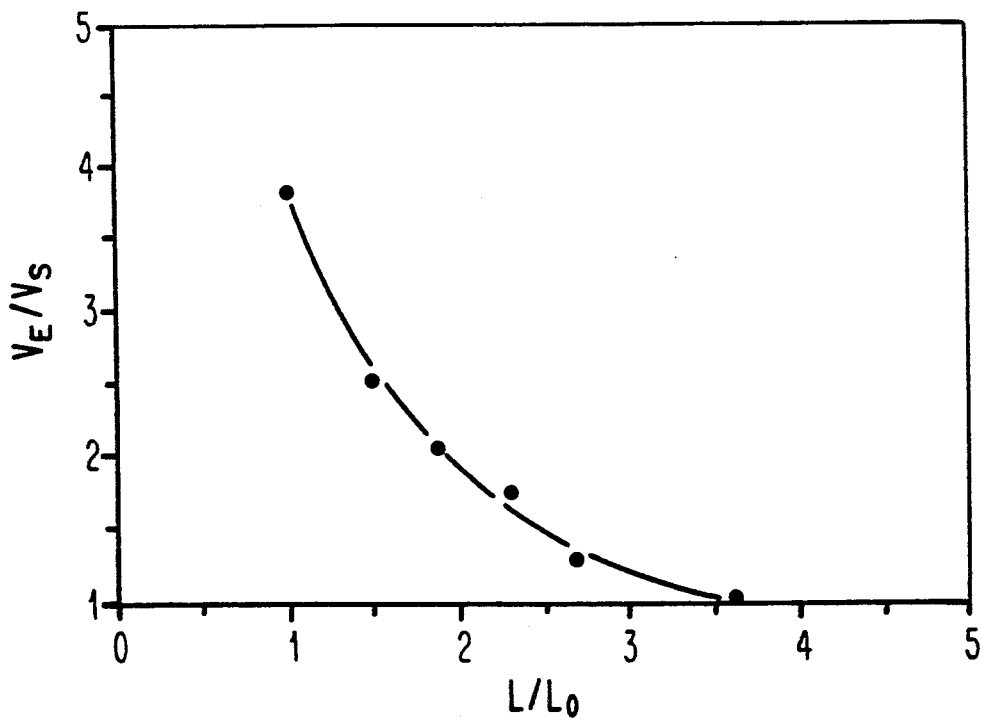
FIG. 5 is a graph showing the manner in which the expansion and contraction of a sample of polyaniline gel film depends upon the extent to which it has been stretched.

Samples of gel film prepared according to Example 2 having known length ($L_0$) were mechanically stretched at about 100° C. under nitrogen atmosphere to varying multiples ($L/L_0$) of their original lengths. The samples were immediately immersed in NMP. The films expanded after washing with NMP, at which time the NMP extract was colorless. The volumes ($V_E$) of the samples in the expanded state were determined. The samples were then immersed in methanol for about 10 minutes and their volumes ($V_S$) in the shrunken state were determined. FIG. 5 shows the data obtained.

Figure 6:
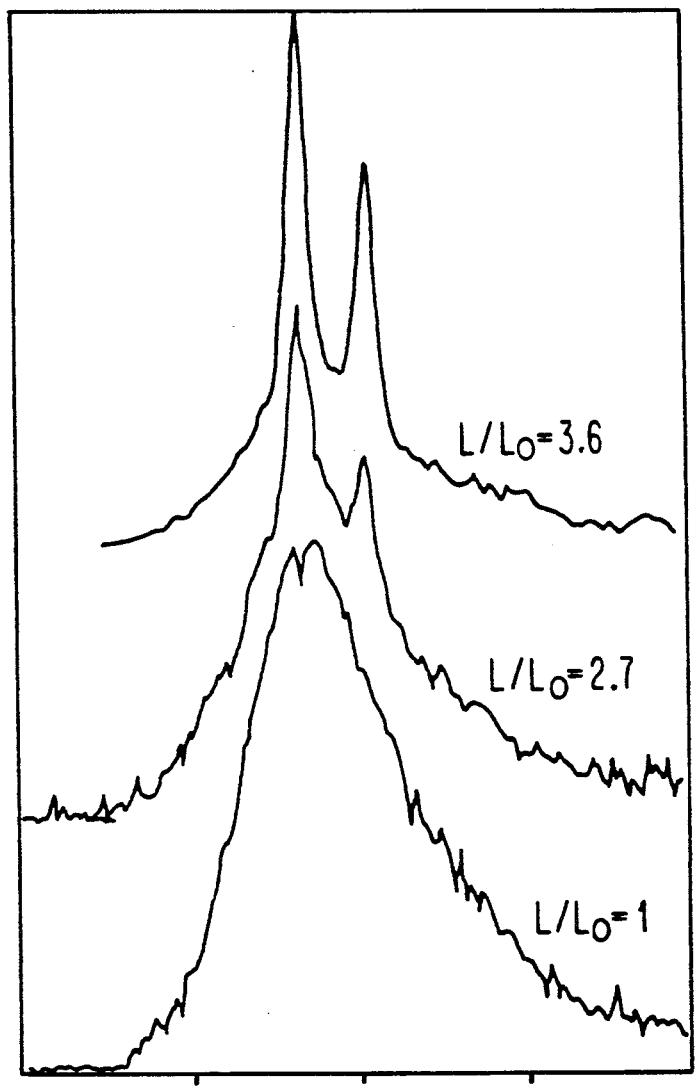
FIG. 6 is graph showing the manner in which samples of polyaniline gel film become more crystalline with stretching.

As can be seen, it appears that the gel film becomes less swellable with increased stretching. This was corroborated by X-ray diffraction analysis. As can be seen from FIG. 6, the samples became more crystalline with stretching. It is believed that stretching the gels of the invention facilitates cross-linking which, in turn, causes the polymer gels progressively to lose their gel characteristics, including shape memory properties.

EXAMPLE 7

Doping of Emeraldine Base Gel Films

Eight 10 mm.×10 mm. samples of dry gel film prepared according to Example 3 were swollen by immersion in about 5 ml. of NMP in 8 separate containers. Another 8 10 mm.×10 mm. samples were shrunken by immersion in 5 ml. of methanol in 8 separate containers. After about 10 minutes, about 3 ml. of a 0.5 M solution of pentadecafluorooctanoic acid, $CF_3(CF_2)_6COOH$, in methanol/water (1:1) was added dropwise to each of the 16 containers. The films in NMP started to shrink immediately. After about 1 minute, all 16 films were transferred to the 0.5 M pentadecafluorooctanoic acid solution in methanol/water and doping time recorded. The films were removed after different intervals and were dipped briefly in distilled water. They were then dried under dynamic vacuum for about 48 hours.

Figure 7:
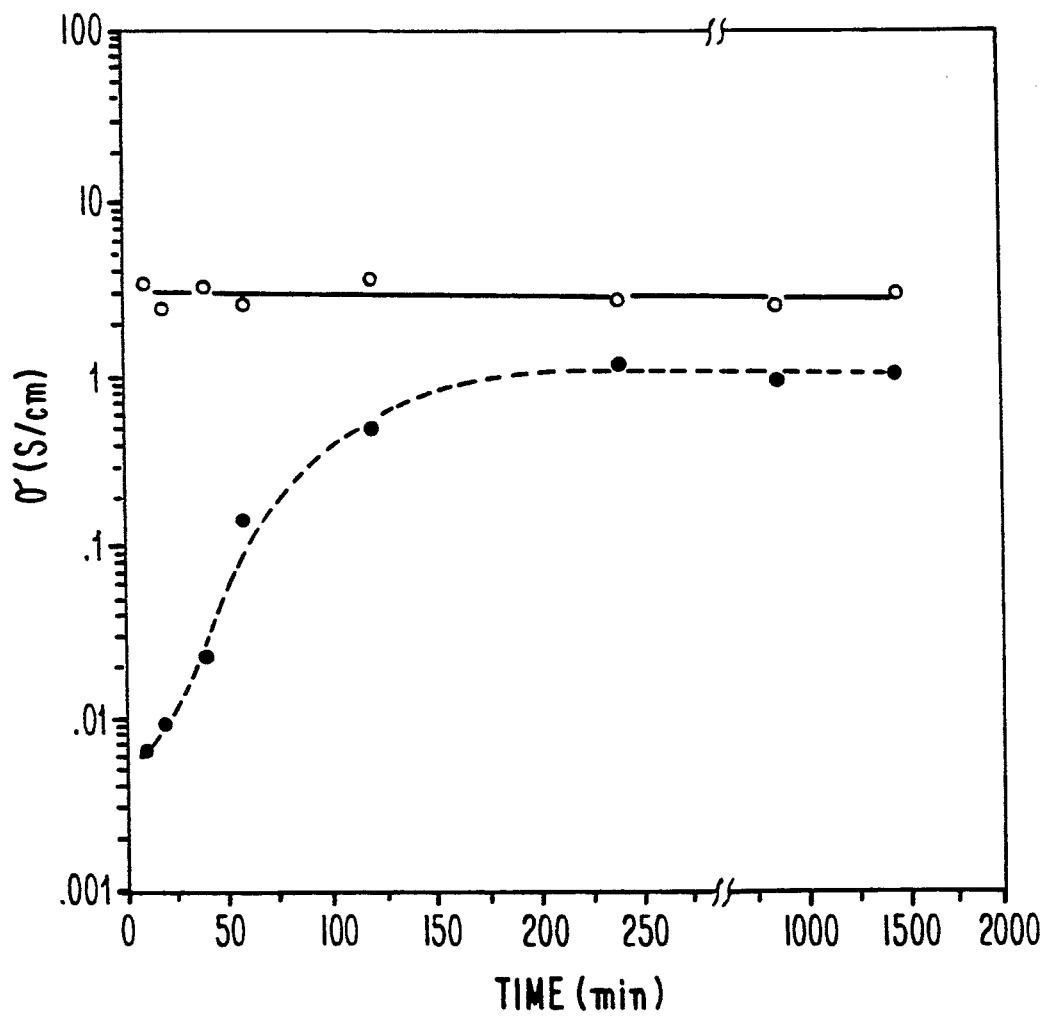
FIG. 7 is a graph showing the manner in which the conductivity of a sample of polyaniline gel film depends upon doping time.

The conductivity ($\sigma$, S/cm) of each sample was then measured. In FIG. 7, $\sigma$ is plotted as a function of doping time, the symbol "° " denotes gel doped in the swollen state and the symbol "." denotes gel doped in the shrunken state. As can be seen, both the rate and overall extent of doping is greater for the swollen gel. These effects are believed to be attributable to the greater access to the cross-linked polymer network afforded the dopant when the gel is in the swollen state.

EXAMPLE 8

Expansion of Doped Gel Films

Five of the dried samples of gel film from Example 7 which had been doped in the swollen state over different periods of time were each measured (about 11 mm.×11 mm.) and their areas ($A_0$) determined. The samples were immersed in 5 containers, each containing about 5 ml. of NMP.

Five of the dried samples of gel film from Example 7 which had been doped in the shrunken state over different periods of time were each measured (about 9 mm.×9 mm.) and their areas ($A_0$) determined. The samples were immersed in another 5 containers, each containing about 5 ml. of NMP.

After about 4 days, all 10 samples were removed from the NMP. The NMP in the first set of 5 containers did not appear to be colored., while the NMP in the second set of 5 containers had a faint, light blue color.

The dimensions of all 10 samples were measured while still wet and their areas (A) determined. The samples were then dipped briefly in distilled water and dried in dynamic vacuum for about 48 hours. The conductivity ($\sigma$, S/cm) of each sample was then measured. The following data were obtained:

| Doping Time | Doped in Swollen State | | Doped in Shrunken State | |
| --- | --- | --- | --- | --- |
| | $\sigma$ | $A/A_0$ | $\sigma$ | $A/A_0$ |
| 10 min. | $2.4 \times 10^{-2}$ | 0.97 | $<2.4 \times 10^{-6}$ | 3.45 |
| 1 hr. | $1.2 \times 10^{-2}$ | 0.97 | $<1.1 \times 10^{-6}$ | 3.41 |
| 4 hrs. | $5.2 \times 10^{-2}$ | 0.97 | $<1.1 \times 10^{-6}$ | 2.33 |
| 14 hrs. | $2.2 \times 10^{-2}$ | 1.05 | $<1.1 \times 10^{-6}$ | 1.94 |
| 24 hrs. | $1.7 \times 10^{-2}$ | 1.00 | $<1.0 \times 10^{-6}$ | 2.24 |

As can be seen by comparison with the data given in FIG. 7, immersion in NMP, a weak base, appears to decrease the conductivity of the gels, most likely by deprotonation and partial conversion to the insulating emeraldine base form. These data, particularly those for the samples doped 4, 14, and 24 hours, suggest that the doping of films in the shrunken state is less homogeneous. That is, doping is greater near the surface than in the interior of the film and, hence, the film is more easily undoped. As can be seen from FIG. 7, the $\sigma$ of the samples doped in the shrunken state was only about 3 S/cm lower than those doped in the swollen state, but after immersion for 4 days in NMP they were about $10^4$ S/cm lower than those doped in the swollen state.

It appears that when film doped in the swollen state—which undergoes shrinkage during doping—is placed in NMP for 4 days, it undergoes essentially no change in dimensions and undergoes less undoping since it is more difficult for the NMP to reach the interior of the film.

It should be noted that films doped in the shrunken state undergo swelling when placed in NMP and that this swelling becomes greater with smaller doping levels. The swelling which accompanies this undoping indicates that the partly doped polymers still exhibit the swellability characteristics of gels.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A gel which comprises a network of cross-linked polymer and a liquid, said network comprising at least one polyaniline derivative.

2. The gel of claim 1 wherein the liquid swells the cross-linked polymer.

3. The gel of claim 1 wherein the liquid shrinks the cross-linked polymer.

4. The gel of claim 1 wherein the liquid hydrogen-bonds with the polymer.

5. The gel of claim 1 wherein the liquid comprises 1-methyl-2-pyrrolidinone.

6. The gel of claim 1 wherein the polyaniline derivative has the structure:

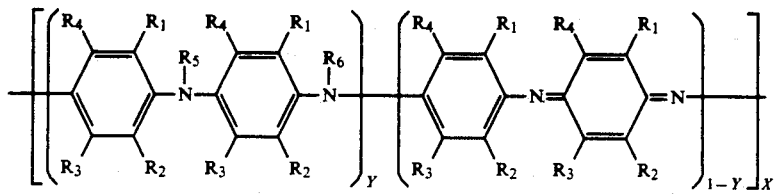

wherein Y=0-1 and $R_1$, $R_2$, $R_3$, and $R_4$ are independently hydrogen, alkyl having from about 1 to about 6 carbon atoms, alkoxyl having from about 1 to about 6 carbon atoms, $SO_3H$, $R_r$—$SO_2$ or $R_r$—$CO_2$, and $R_5$ and $R_6$ are independently hydrogen, alkyl having from about 1 to about 6 carbon atoms, alkoxyl having from about 1 to about 6 carbon atoms, $R_r$—$SO_2$ or $R_r$—$CO_2$, wherein $R_r$ is aryl or alkyl having from about 1 to about 6 carbon atoms.

7. The gel of claim 6 wherein $R_1$, $R_2$, $R_3$, $R_4$, $R_5$, and $R_6$ are hydrogen.

8. The gel of claim 6 wherein $R_1$ is methoxy or ethoxy and $R_2$, $R_3$, $R_4$, $R_5$, and $R_6$ are hydrogen.

9. The gel of claim 1 wherein at least one polyaniline derivative comprises emeraldine base.

10. The gel of claim 1 wherein the polyaniline derivative has the structure:

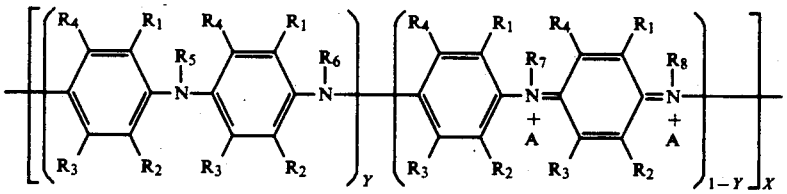

wherein A is an anionic species, Y=0-1, and $R_1$, $R_2$, $R_3$, and $R_4$ are independently hydrogen, alkyl having from about 1 to about 6 carbon atoms, alkoxyl having from about 1 to about 6 carbon atoms, $SO_3H$, $R_r$—$SO_2$ or $R_r$—$CO_2$, and $R_5$, $R_6$, $R_7$, and $R_8$ are independently hydrogen, alkyl having from about 1 to about 6 carbon atoms, alkoxyl having from about 1 to about 6 carbon atoms, $R_r$—$SO_2$ or $R_r$—$CO_2$, wherein $R_r$ is aryl or alkyl having from about 1 to about 6 carbon atoms.

11. The gel of claim 10 wherein $R_1$, $R_2$, $R_3$, $R_4$, $R_5$, $R_6$, $R_7$, and $R_8$ are hydrogen.

12. The gel of claim 10 wherein $R_1$ is methoxy or ethoxy and $R_2$, $R_3$, $R_4$, $R_5$, $R_6$, $R_7$, and $R_8$ are hydrogen.

13. The gel of claim 1 wherein at least one polyaniline derivative comprises emeraldine salt.

14. The gel of claim 1 wherein the polymer is cross-linked partially through covalent bonds.

15. The gel of claim 1 wherein the polymer is cross-linked substantially through physical interactions.

16. The gel of claim 1 wherein the polymer is cross-linked substantially through crystallization.

17. The gel of claim 1 which comprises from about 5 to about 90 weight percent polyaniline derivative.

18. A shaped article which comprises at least one gel of claim 1.

19. A method for preparing network of cross-linked polymer, comprising the steps of:
providing a polymer which comprises at least one polyaniline derivative;
admixing the polymer with a liquid; and
cross-linking the polymer.

20. The method of claim 19 wherein the polyaniline derivative has the structure:

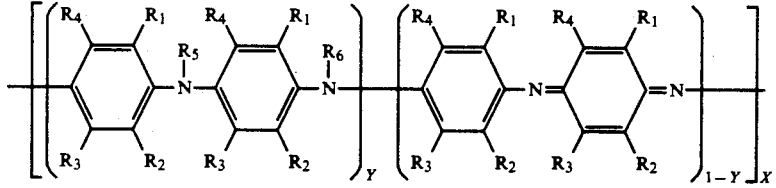

wherein Y=0-1 and $R_1$, $R_2$, $R_3$, and $R_4$ are independently hydrogen, alkyl having from about 1 to about 6 carbon atoms, alkoxyl having from about 1 to about 6 carbon atoms, $SO_3H$, $R_r$—$SO_2$ or $R_r$—$CO_2$, and $R_5$ and $R_6$ are independently hydrogen, alkyl having from about 1 to about 6 carbon atoms, alkoxyl having from about 1 to about 6 carbon atoms, $R_r$—$SO_2$ or $R_r$—$CO_2$, wherein $R_r$ is aryl or alkyl having from about 1 to about 6 carbon atoms.

21. The method of claim 19 wherein the polyaniline derivative comprises emeraldine base.

22. The method of claim 19 wherein the polyaniline derivative has the structure:

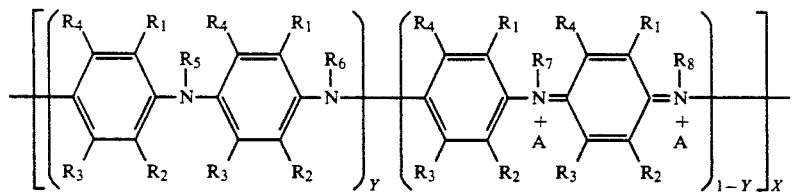

wherein Y=0-1, A is an anionic species, and $R_1$, $R_2$, $R_3$, and $R_4$ are independently hydrogen, alkyl having from about 1 to about 6 carbon atoms, alkoxyl having from about 1 to about 6 carbon atoms, $SO_3H$, $R_r$—$SO_2$ or $R_r$—$CO_2$, and $R_5$, $R_6$, $R_7$, and $R_8$ are independently hydrogen, alkyl having from about 1 to about 6 carbon atoms, alkoxyl having from about 1 to about 6 carbon atoms, $R_r$—$SO_2$ or $R_r$—$CO_2$, wherein $R_r$ is aryl or alkyl having from about 1 to about 6 carbon atoms.

23. The method of claim 19 wherein the polyaniline derivative comprises emeraldine salt.

24. The method of claim 19 wherein the polyaniline derivative is substantially linear.

25. The method of claim 19 wherein the cross-linked polymer is substantially insoluble in the liquid.

26. The method of claim 19 wherein the liquid swells the cross-linked polymer.

27. The method of claim 19 wherein the liquid hydrogen-bonds with the cross-linked polymer.

28. The method of claim 19 wherein the liquid comprises 1-methyl-2-pyrrolidinone.

29. The method of claim 19 wherein the admixture comprises from about 5 to about 30 weight percent polyaniline derivative.

30. The method of claim 19 wherein the admixture comprises about 20 weight percent polyaniline derivative.

31. The method of claim 19 further comprising agitating the admixture for an amount of time effective to increase its viscosity.

32. The method of claim 19 further comprising placing the admixture in contact with a substrate.

33. The method of claim 19 further comprising stretching the cross-linked polymer.

34. The method of claim 19 further comprising rendering the cross-linked polymer electrically conductive.

35. The method of claim 19 further comprising contacting the cross-linked polymer with an amount of aqueous protonic acid effective render the cross-linked polymer electrically conductive.

36. The polyaniline cross-linked polymer produced in accordance with claim 19.

37. A composition of matter prepared by a method which comprises:
providing a polymer which comprises at least one polyaniline derivative;
admixing the polymer with a liquid; and
providing reaction conditions effective to substantially solidify the admixture.

* * * * *